United States Patent
Holloway et al.

(10) Patent No.: US 9,651,020 B2
(45) Date of Patent: May 16, 2017

(54) PORTABLE CRANE FOR USE IN WIND TURBINES

(71) Applicant: General Electric Company, Schenectady, NY (US)

(72) Inventors: Brent Hamilton Holloway, Greenville, SC (US); Adam S. Davis, Livermore, CO (US); Michael Spitsbergen, La Mesa, CA (US)

(73) Assignee: General Electric Company, Schenectady, NY (US)

( * ) Notice: Subject to any disclaimer, the term of this patent is extended or adjusted under 35 U.S.C. 154(b) by 596 days.

(21) Appl. No.: 14/034,763

(22) Filed: Sep. 24, 2013

(65) Prior Publication Data

US 2015/0086367 A1    Mar. 26, 2015

(51) Int. Cl.
    *F03D 11/00*    (2006.01)
    *F03D 1/00*     (2006.01)
    *B66C 23/20*    (2006.01)

(52) U.S. Cl.
    CPC ............ *F03D 1/003* (2013.01); *B66C 23/207* (2013.01); *F05B 2240/916* (2013.01); *Y02E 10/726* (2013.01); *Y02E 10/728* (2013.01)

(58) Field of Classification Search
    CPC .......... F03D 1/001; F03D 1/003; F03D 1/005; F03D 1/006; B66C 23/207
    See application file for complete search history.

(56) References Cited

U.S. PATENT DOCUMENTS

| | | | |
|---|---|---|---|
| 6,499,610 B2 | 12/2002 | Spitsbergen | |
| 7,537,088 B2 | 5/2009 | Spitsbergen | |
| 7,735,808 B2 | 6/2010 | Viladomiu et al. | |
| 7,789,252 B2 | 9/2010 | Dehlsen et al. | |
| 7,931,254 B2 | 4/2011 | Teichert et al. | |
| 8,087,895 B2 | 1/2012 | Pedersen | |
| 8,104,631 B2 * | 1/2012 | Stegemann | B66C 23/06 212/179 |
| 2011/0168654 A1 | 7/2011 | Ahler et al. | |
| 2012/0073134 A1* | 3/2012 | Bywaters | F03D 1/003 29/889.1 |
| 2012/0308388 A1 | 12/2012 | Smook | |
| 2013/0098859 A1 | 4/2013 | Soe et al. | |

FOREIGN PATENT DOCUMENTS

| | | |
|---|---|---|
| CA | 2811114 | 4/2012 |
| EP | 1677006 | 7/2006 |
| EP | 1677007 | 7/2006 |
| GB | 2487230 | 7/2012 |
| WO | WO 2011/134472 | 11/2011 |

* cited by examiner

*Primary Examiner* — Richard Edgar
(74) *Attorney, Agent, or Firm* — Dority & Manning, P.A.

(57) ABSTRACT

Portable cranes for wind turbines are provided. In one embodiment, a crane includes a boom, a support shaft connected to the boom, and a plurality of interchangeable mount assemblies. Each of the plurality of mount assemblies is removably connectable to the support shaft and mountable to a wind turbine component. The crane is mountable to at least two different wind turbine components. In another embodiment, a crane includes a boom, a support shaft connected to the boom, and means for mounting the crane to at least one uptower wind turbine component and at least one downtower wind turbine component.

19 Claims, 6 Drawing Sheets

PORTABLE CRANE FOR USE IN WIND TURBINES

FIELD OF THE INVENTION

The present disclosure relates generally to wind turbines, and more particularly to portable cranes for use in the wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During assembly, operation and maintenance of a wind turbine, various wind turbine components may require moving within the wind turbine. For example, relatively heavy components may in some cases need to be moved into the tower of the wind turbine, from the yaw deck into the nacelle, and to various locations within the nacelle.

Known apparatus for moving such components into and within a wind turbine can be bulky, dangerous, and expensive. Further, such known apparatus are generally not versatile, and rather for example are designed for moving heavy components only from one single location to another single location. Currently known nacelle cranes are an example of such apparatus. Further, known apparatus typically require two to three workers for suitable operation, thus increasing both the expense and the risk of accidents during operation.

Accordingly, improved apparatus for moving relatively heavy components into and within wind turbines are desired. In particular, portable cranes which are lightweight, inexpensive, and have high load capacities would be advantageous.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a portable crane for a wind turbine. The crane includes a boom, a support shaft connected to the boom, and a plurality of interchangeable mount assemblies. Each of the plurality of mount assemblies is removably connectable to the support shaft and mountable to a wind turbine component. The crane is mountable to at least two different wind turbine components.

In another embodiment, the present disclosure is directed to a portable crane for a wind turbine. The crane includes a boom, a support shaft connected to the boom, and means for mounting the crane to at least one uptower wind turbine component and at least one downtower wind turbine component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
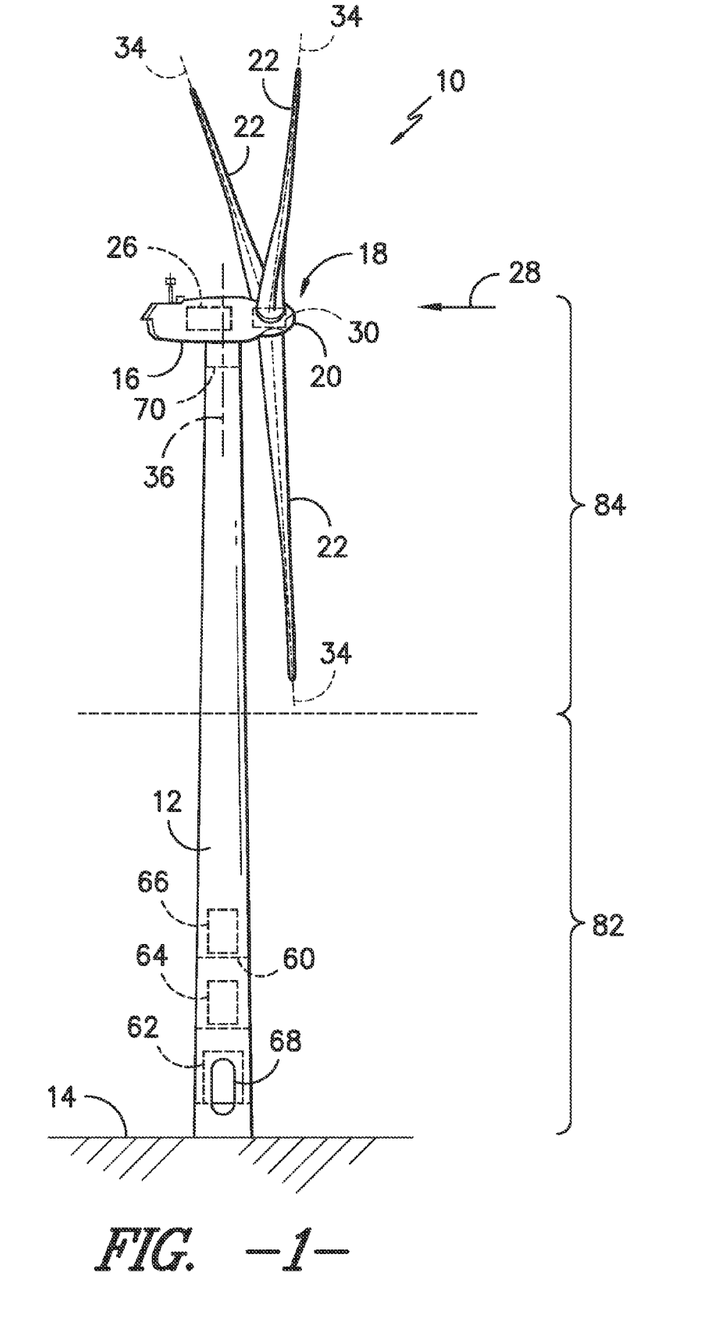
FIG. 1 is a perspective view of a wind turbine according to one embodiment of the present disclosure.

FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 (FIG. 2) of the wind turbine, or by directly controlling the operation of the plurality of pitch drives or pitch adjustment mechanisms. Specifically, the rotor blades 22 may be rotatably mounted to the hub 20 by one or more pitch bearing(s) (not illustrated) such that the pitch angle may be adjusted by rotating the rotor blades 22 along their pitch axes 34 using the pitch adjustment mechanisms 32. Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36.

It should be appreciated that the turbine controller 26 and/or the pitch controller 30 may generally comprise a computer or any other suitable processing unit. Thus, in several embodiments, the turbine controller 26 and/or pitch and yaw controllers may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 and/or pitch and yaw controllers may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the turbine controller 26 and/or pitch and yaw controllers to perform various computer-implemented functions. In addition, the turbine controller 26 and/or pitch and yaw controllers may also include various input/output channels for receiving inputs from sensors and/or other measurement devices and for sending control signals to various components of the wind turbine 10.

Figure 2:
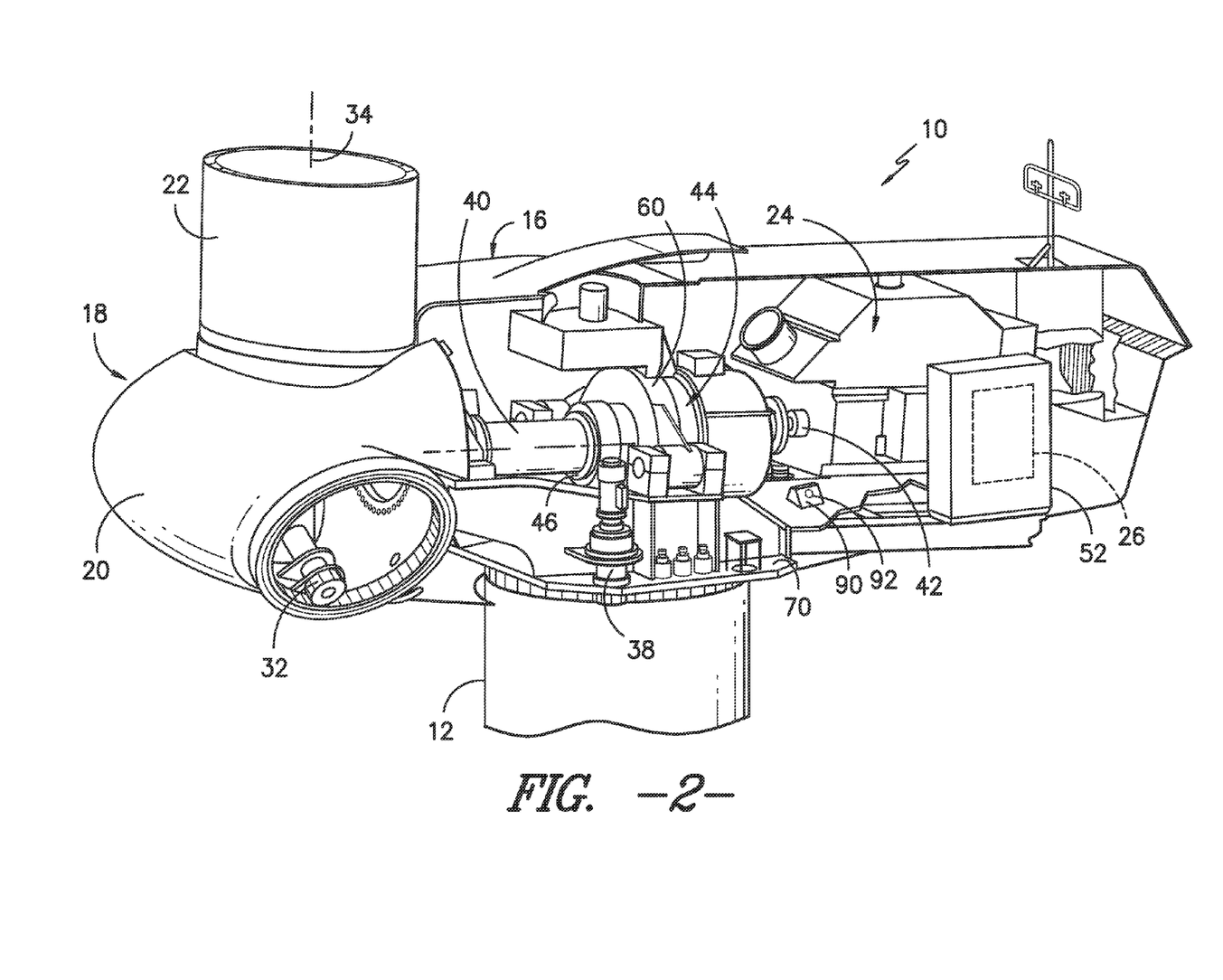
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40 (often referred to as a "direct-drive wind turbine").

It should be appreciated that the main shaft 40 may generally be supported within the nacelle by a support frame or bedplate 46 positioned atop the wind turbine tower 12. For example, the main shaft 40 may be supported by the bedplate 46 via one or more pillow blocks mounted to the bedplate 46.

Additionally, as indicated above, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described above, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) through the pitch controller 30 for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

Referring again to FIG. 1, the tower 12 may include various platforms disposed in an interior thereof. For example, one or more downtower platforms 60 may be provided. A downtower platform 60 may support various other wind turbine 10 components, such as a transformer 62, power distribution system 64, and/or power converter 66. A door 68 may be defined in the tower 12, such as in a downtower portion of the wind turbine 10 as defined by the tower 12, and may provide access to a lower downtower platform 60 and to the tower 12 interior in general.

One or more uptower platforms 70 may additionally be provided. Such uptower platforms 70 may be provided in an uptower portion of the wind turbine 10 as defined by the tower 12. Additionally, a yaw platform 72 (FIG. 2) may be provided in the nacelle 16. Access to the nacelle 16 from the tower 12 may be facilitated through access from an uptower platform 70 to the yaw platform 72, and from the yaw platform 72 to the bedplate 46.

As mentioned, various components and locations herein may be referred to as "uptower" or "downtower" components or locations. Tower 12 may thus generally define an uptower portion 80 of the wind turbine 10 and a downtower portion 82 of the wind turbine 10. An uptower portion 80 is a portion of the wind turbine 10 that is accessible generally by climbing up a majority, such as at least half the length, of the tower 12. Thus, the nacelle 14 and rotor 18 components and upper platforms 70 are considered uptower components. A downtower portion 82 is a portion of the wind turbine 10 that is accessible generally without requiring climbing up a majority of the tower 12. Thus, lower platforms 60 and the components thereon, as well as the door 68 and locations at the base of the tower 12 both inside and outside of the tower, are considered downtower components.

Figure 5:
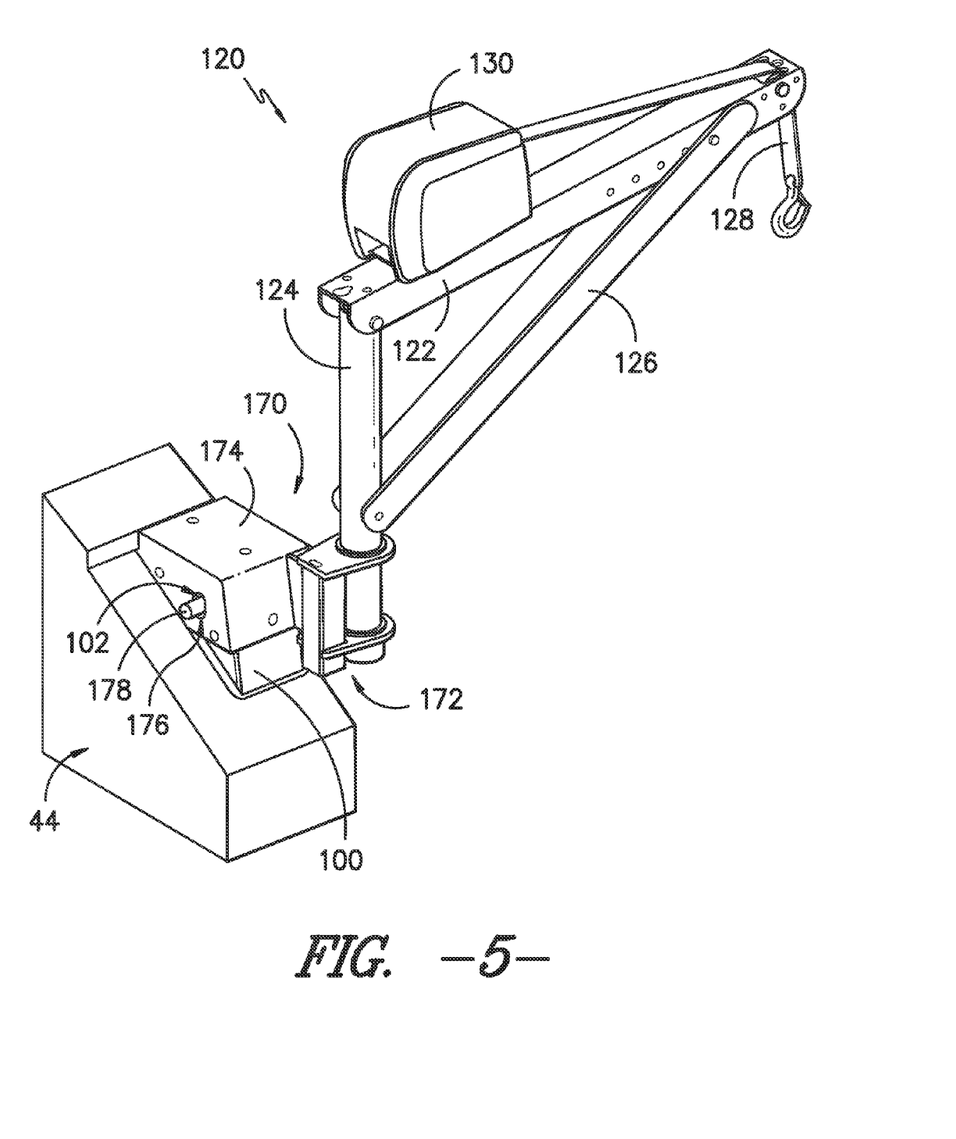
FIG. 5 illustrates a portable crane mounted to a wind turbine gearbox transition eye in accordance with one embodiment of the present disclosure.
Figure 6:
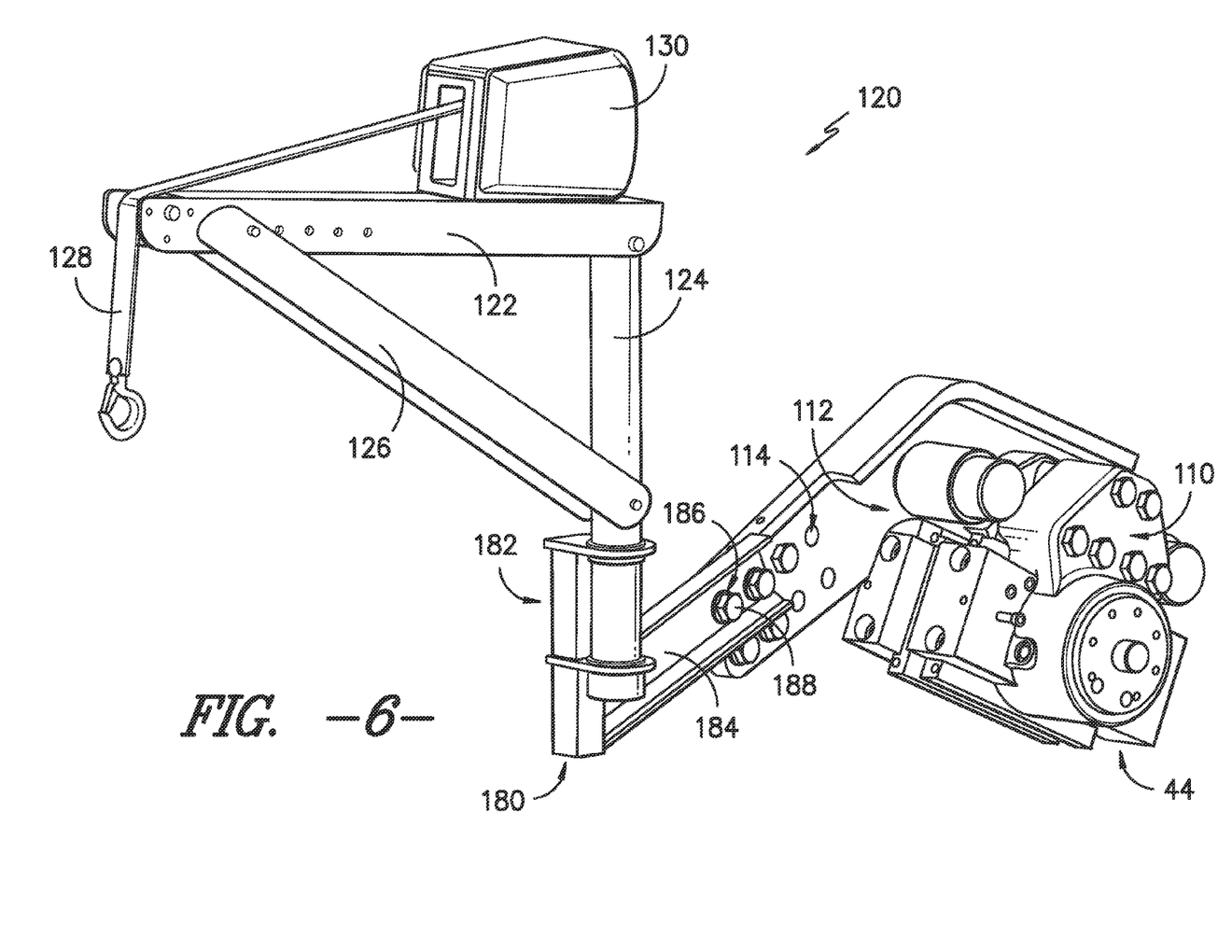
FIG. 6 illustrates a portable crane mounted to a wind turbine gearbox brake caliper in accordance with one embodiment of the present disclosure.

As further illustrated in FIG. 2, bedplate 46 may include various components extending therefrom. For example, one or more lift eyes 90 may extend from the bedplate 46 surface. Each lift eye 90 may include a bore hole 92 defined therein. Additionally, as illustrated in FIG. 5, gearbox 44 may include a transition eye 100 extending therefrom. Each transition eye 100 may include a bore hole 102 defined therein. Further, as illustrated in FIG. 6, gearbox 44 may include a brake caliper 110. A flange 112 may extend from brake caliper 110, and a plurality of bore holes 114 may be defined therein.

As discussed, improved apparatus for moving relatively heavy components into and within wind turbines 10 are desired. Accordingly, the present disclosure is further directed to portable cranes 120 for use in wind turbine 10, and wind turbines 10 which include such portable cranes 120 therein. Referring now to FIGS. 3 through 6, various embodiments of crane 120 are illustrated. As shown, crane 120 includes a boom 122 and a support shaft 124 connected to the boom 122. Various linkages 126 may additionally be provided to support the connection between the shaft 124 and boom 122. A lift cable 128 may additionally be provided, and a winch 130 may raise and lower the cable 128.

Further, a crane 120 according to the present disclosure includes means for mounting the crane 120 to a plurality of wind turbine 10 components. In exemplary embodiments, as discussed herein, such means may include a plurality of interchangeable mount assemblies. At least two mount assemblies may thus be provided for each crane 120, and three, four, five, six or more mount assemblies are within the scope and spirit of the present disclosure. Each mount assembly may be removably connectable to the support shaft 124 of the crane 120. Further each mount assembly may be mountable to a wind turbine 10 component, thus facilitating mounting of the crane 120 to at least two different wind turbine 10 components.

The use of various interchangeable mount assemblies in accordance with the present disclosure advantageously facilitates the portability of the crane 120. Each mount assembly can typically weigh less than approximately 45 pounds, and the remainder of the crane 120 is similarly lightweight, such that a single worker can easily transport the crane 120 into and throughout the wind turbine 10. Further, as discussed, the crane is mountable to a variety of wind turbine 10 components, through the use of such interchangeable mount assemblies. This allows a worker to, as desired, transport relatively heavy components into and throughout the wind turbine 10 with relative ease and efficiency.

In some exemplary embodiments, the mounting means, such as the interchangeable mounting assemblies, may facilitate mounting of the crane 120 to at least one uptower component and at least one downtower component. Additionally or alternatively, the mounting means, such as the interchangeable mounting assemblies, may facilitate mounting of the crane 120 to at least two uptower components and/or at least two downtower components. Such various components may be different components, and may thus for example require the use of different interchangeable mounting assemblies.

It should be understood that the various wind turbine 10 components, such as the uptower and downtower components described herein, are preexisting wind turbine components. Thus, no modifications to the wind turbine 10 are required for use with cranes 120 according to the present disclosure. For example, dedicated crane mounts are not required to be manufactured and/or installed in the wind turbine 10.

Figure 3:
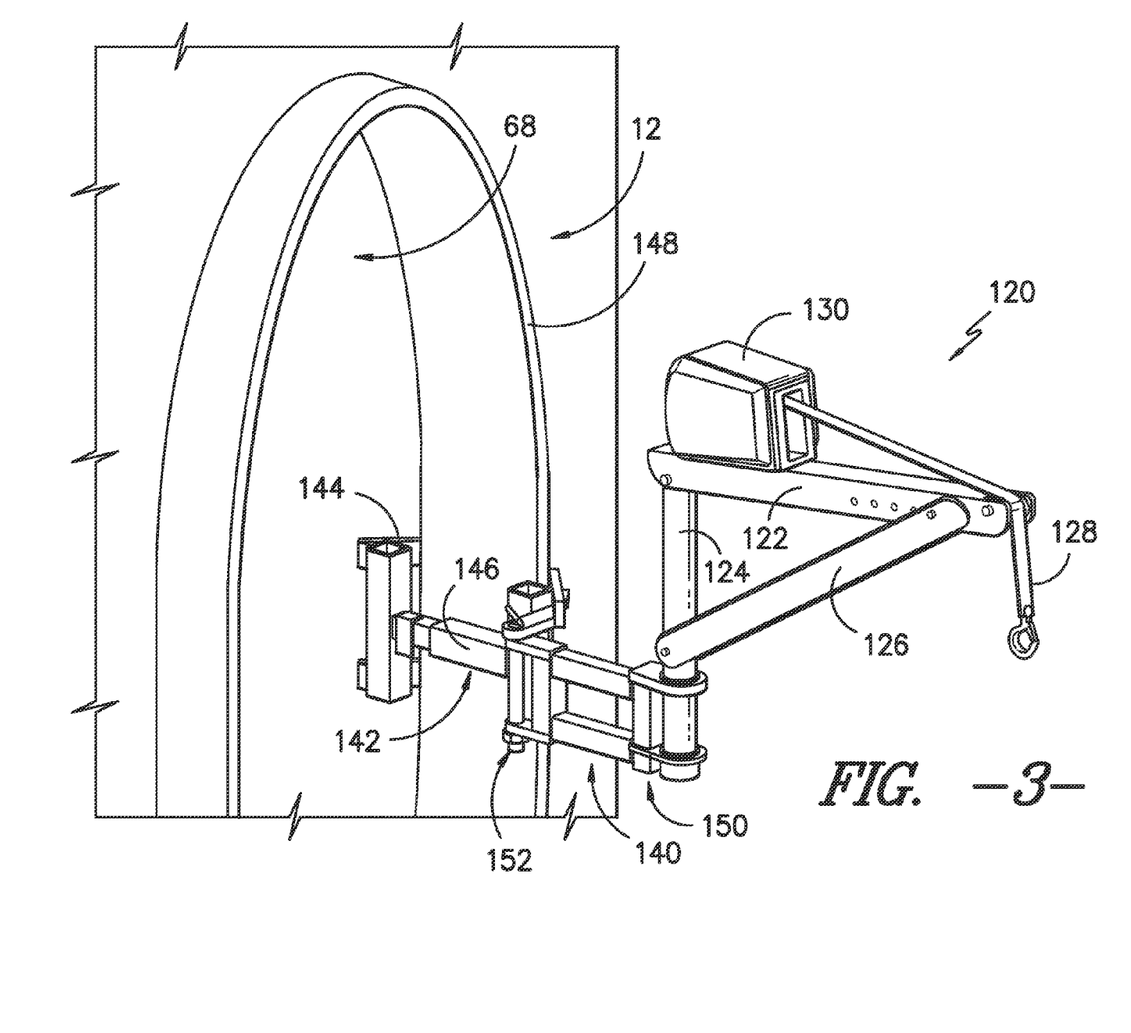
FIG. 3 illustrates a portable crane mounted to a wind turbine tower door in accordance with one embodiment of the present disclosure.

As discussed, FIGS. 3 through 6 illustrate various embodiments of cranes 120 according to the present disclosure. Specifically, various mount assemblies are provided. For example, FIG. 3 illustrates a mount assembly 140 for use with the door 68 of the wind turbine tower 12 (one example of a downtower component). Mount assembly 140 includes a clamp portion 142, which includes opposing braces 144 spaced apart by a retractable spacer 146. The opposing braces 144 contact opposing sides of a frame 148 of the door 68, and the retractable spaces 146 can be retracted to clamp the clamp portion 142, and thus the mount assembly 140, onto the door 68. Support shaft 124 may be rotatably mounted within a first hinge portion 150, which may be rotatably connected to a second hinge portion 152. The second hinge portion 152 may be connected to the clamp portion 142. The first and second hinge portions 150, 152 may each allow rotation about central longitudinal axes, facilitating movement of the support shaft 124 and other crane 120 components. Thus, the crane 120 may be utilized to move heavy components from outside of the wind turbine 10 into the interior of the wind turbine 10, such as onto a downtower platform 60.

Figure 4:
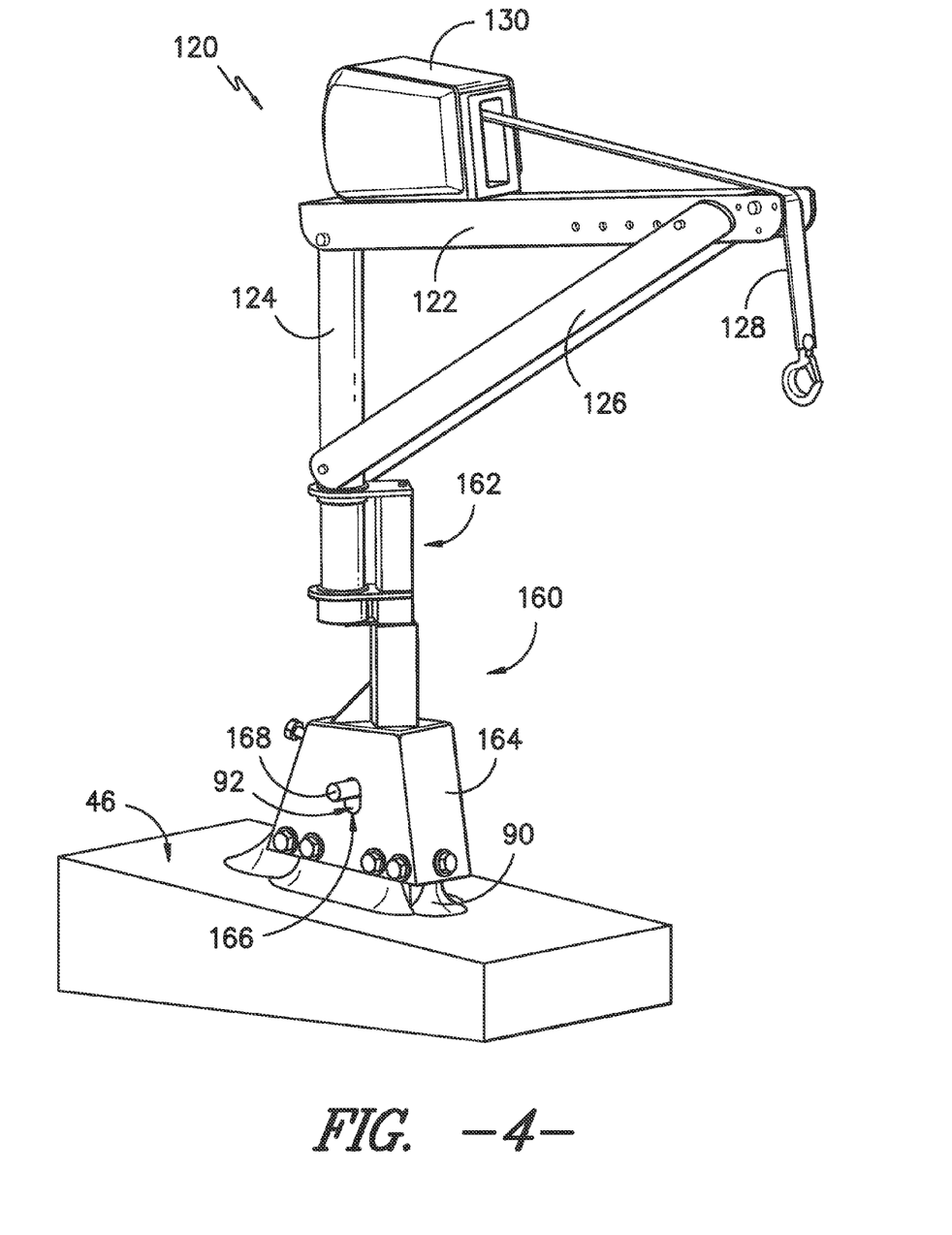
FIG. 4 illustrates a portable crane mounted to a wind turbine bedplate in accordance with one embodiment of the present disclosure.

FIG. 4 illustrates a mount assembly 160 for use with a bedplate 46, such as with a lift eye 90 thereof (one example of an uptower component). Support shaft 124 may be rotatably mounted within a hinge portion 162. The hinge portion 162 may be connected to an enclosure 164, which may be sized to fit over the lift eye 90. Bore holes 166 may be defined in the enclosure 164. A mechanical fastener, such as a bolt 178, may be extended through the bore holes 166 of the enclosure 164 and the bore hole 92 of the lift eye 90, thus coupling the enclosure 164 and mount assembly 160 in general to the lift eye 90 and bedplate 46. The hinge portion 162 may allow rotation of the support shaft 124 about a central longitudinal axis, facilitating movement of the support shaft 124 and other crane 120 components. Thus, the crane 120 may be utilized to move heavy components inside the nacelle 16, such as from the yaw platform 72 to the bedplate 46 and to various locations on the bedplate 46.

FIGS. 5 and 6 illustrate mount assemblies for use with a gearbox 44. For example, FIG. 5 illustrates a mount assembly 170 for use with a transition eye 100 of a gearbox 44 (another example of an uptower component). Support shaft 124 may be rotatably mounted within a hinge portion 172. The hinge portion 172 may be connected to an enclosure 174, which may be sized to fit over the transition eye 100. Bore holes 176 may be defined in the enclosure 174. A mechanical fastener, such as a bolt 178, may be extended through the bore holes 176 of the enclosure 174 and the bore hole 102 of the transition eye 100, thus coupling the enclosure 174 and mount assembly 170 in general to the transition eye 100 and gearbox 44. The hinge portion 172 may allow rotation of the support shaft 124 about a central longitudinal axis, facilitating movement of the support shaft 124 and other crane 120 components. Thus, the crane 120 may be utilized to move heavy components inside the nacelle 16, such to various locations around the gearbox 44.

FIG. 6 illustrates a mount assembly 180 for use with a brake caliper 110 of a gearbox 44 (another example of an uptower component). Support shaft 124 may be rotatably mounted within a hinge portion 182. The hinge portion 182 may be connected to a flange 184, which may abut again flange 112 of the brake caliper 110. Bore holes 186 may be defined in the flange 184. One or more mechanical fasteners, such as bolts 188, may be extended through the bore holes 186 of the flange 184 and bore holes 114 of the flange 112, thus coupling the flange 184 and mount assembly 180 in general to the brake caliper 110 and gearbox 44. The hinge portion 182 may allow rotation of the support shaft 124 about a central longitudinal axis, facilitating movement of the support shaft 124 and other crane 120 components. Thus, the crane 120 may be utilized to move heavy components inside the nacelle 16, such to various locations around the gearbox 44.

It should be understood that the various interchangeable mount assemblies for use with a crane 120 according to the present disclosure are not limited to the above described embodiments or uses. For example, various suitable mount assemblies may be utilized to detachably mount the crane 120 to the door 68, bedplate 46, or generator 44. Further, mount assemblies may be utilized to detachably mount the crane 120 to various other suitable wind turbine 10 components. For example, the crane 120 may be mounted through use of a suitable mount assembly to the generator 24, the yaw platform 72, an uptower platform 70, a downtower platform 82, the hub 20, the main shaft 40, a main bearing, etc. Additionally, a suitable mount assembly may detachably mount the crane 120 to a truck, such as to the hitch thereof, providing a component to the wind turbine 10 to facilitate moving the component from the truck to the wind turbine 10. Attachment of any of the various suitable mount assemblies through, for example, suitable bolting, clamping, or other mounting techniques are within the scope and spirit of the present disclosure.

It should further be understood that while interchangeable mount assemblies are provided as one example of suitable means for mounting a crane 120 to at least two different wind turbine 10 components, other suitable devices and assemblies are within the scope and spirit of the present disclosure. For example, such means may further include a mount assembly that can be modified for use in mounting a crane 120 to two different wind turbine 10 components, or any other suitable mounting means.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A portable crane for a wind turbine, the crane comprising:
   a boom;
   a support shaft connected to the boom; and
   a plurality of interchangeable mount assemblies, each of the plurality of mount assemblies removably connectable to the support shaft and mountable to a wind turbine component, each of the plurality of interchangeable mount assemblies comprising a hinge portion in which the support shaft is rotatably mountable and further comprising one of a clamp, an enclosure or a flange,
   wherein the crane is mountable to at least two different wind turbine components.

2. The portable crane of claim 1, wherein the at least two different wind turbine components comprise an uptower component and a downtower component.

3. The portable crane of claim 1, wherein the at least two different wind turbine components comprise at least two uptower components.

4. The portable crane of claim 1, wherein one of the at least two wind turbine components is a tower door.

5. The portable crane of claim 1, wherein one of the at least two wind turbine components is a bedplate.

6. The portable crane of claim 5, wherein the crane is mountable to a lift eye of the bedplate.

7. The portable crane of claim 1, wherein one of the at least two wind turbine components is a gearbox.

8. The portable crane of claim 7, wherein the crane is mountable to a transition eye of the gearbox.

9. The portable crane of claim 7, wherein the crane is mountable to a brake caliper of the gearbox.

10. A portable crane for a wind turbine, the crane comprising:
    a boom;
    a support shaft connected to the boom; and
    means for mounting the crane to at least one uptower wind turbine component and at least one downtower wind turbine component, the means comprising a plurality of interchangeable mount assemblies, each of the plurality of mount assemblies removably connectable to the support shaft and mountable to one of an uptower wind turbine component or a downtower wind turbine component, each of the plurality of interchangeable mount assemblies comprising a hinge portion in which the support shaft is rotatably mountable and further comprising one of a clamp, an enclosure or a flange.

11. The portable crane of claim 1, wherein the at least one downtower component comprises a tower door.

12. The portable crane of claim 1, wherein the at least one uptower component comprises a bedplate.

13. The portable crane of claim 1, wherein the at least one uptower component comprises a gearbox.

14. A wind turbine, comprising:
    a tower defining an uptower portion and a downtower portion of the wind turbine;
    a door defined in the downtower portion;
    a nacelle mounted to the tower and disposed in the uptower portion;
    a rotor coupled to the nacelle, the rotor comprising a hub and a plurality of rotor blades;
    a bedplate disposed within the nacelle;
    a gearbox mounted to the bedplate; and
    a portable crane mountable to at least two different wind turbine components, the portable crane comprising:
       a boom;
       a support shaft connected to the boom; and
       a plurality of interchangeable mount assemblies, each of the plurality of mount assemblies removably connectable to the support shaft and mountable to a wind turbine component, each of the plurality of interchangeable mount assemblies comprising a hinge portion in which the support shaft is rotatably mountable and further comprising one of a clamp, an enclosure or a flange.

15. The wind turbine of claim 14, wherein the at least two different wind turbine components comprise an uptower component and a downtower component.

16. The wind turbine of claim 14, wherein the at least two different wind turbine components comprise at least two uptower components.

17. The wind turbine of claim 14, wherein one of the at least two wind turbine components is a tower door.

18. The wind turbine of claim 14, wherein one of the at least two wind turbine components is a bedplate.

19. The wind turbine of claim 14, wherein one of the at least two wind turbine components is a gearbox.

* * * * *